United States Patent [19]
Sherwood

[11] 3,975,262
[45] Aug. 17, 1976

[54] SYNCHRONIZED PRODUCE SORTING SYSTEM

[75] Inventor: John R. Sherwood, Arlington, Va.

[73] Assignee: AMF Incorporated, White Plains, N.Y.

[22] Filed: Sept. 12, 1975

[21] Appl. No.: 612,594

[52] U.S. Cl. .......................... 209/111.6; 209/74 M; 250/561
[51] Int. Cl.² .......................................... B07C 5/10
[58] Field of Search ................. 209/73, 74 R, 74 M, 209/111.5, 111.6, 111.7; 250/561

[56] References Cited
UNITED STATES PATENTS

| | | | |
|---|---|---|---|
| 2,999,588 | 9/1961 | Bott et al. | 209/74 R |
| 3,435,950 | 4/1969 | Suverkrop | 209/111.5 X |
| 3,675,769 | 7/1972 | Story | 209/73 |
| 3,773,172 | 11/1973 | McClure et al. | 209/111.6 X |
| 3,880,586 | 4/1975 | Murayama et al. | 209/111.5 X |

Primary Examiner—Robert B. Reeves
Assistant Examiner—Joseph J. Rolla
Attorney, Agent, or Firm—George W. Price; John H. Gallagher

[57] ABSTRACT

A synchronizing system is provided to produce gating pulses which occur only when a pocket between adjacent convoluted rollers is directly under the optical system. These gating pulses control operation of the circuitry of the grading apparatus and the ejection apparatus. With this arrangement, the rollers are in effect blanked out of the field of view of the optical system and the grading system can "see" only articles and objects in the pockets between rollers.

9 Claims, 6 Drawing Figures

SYNCHRONIZED PRODUCE SORTING SYSTEM

BACKGROUND OF THE INVENTION

Apparatus for automatically harvesting and then grading and sorting articles of agricultural produce are known in the art. Such apparatus generally is comprised of means for digging or gathering the articles of produce, such as potatoes or tomatoes, for example, and placing them on a moving endless conveyor. Means are provided for separating the articles from the vines or plants on which they grow and for separating from the produce other foreign matter such as rocks and clods of dirt.

In known potato harvesters, in particular, the apparatus is unable to successfully separate all rocks and clods of dirt from the harvested potatoes. Therefore, the potatoes with the undesired rocks and clods are conveyed to another conveyor which singulates the potatoes and foreign matter into a number of different rows. Each row moves past an inspection position where sources of radiation, such as light, illuminate the articles and foreign matter passing thereby. An optical system and photodetector means positioned above each of the rows of moving articles receives light reflected therefrom and produces two or more electrical signals which are functions of respective color components of light reflected from the articles of produce and from the foreign objects.

The grading of the articles of produce commonly is based upon a comparison and/or other operations on electrical signals which correspond to the color components in the light reflected into the optical system. The electronic apparatus which operates on the color signals is calibrated in such a manner that an eject signal is generated when an object other than a desired article of produce is in the field of view of the optical system. The eject signal actuates appropriate ejection mechanism such as a pneumatic valve and nozzle which produce a blast of air to discharge the undesired object from the conveyor system or from the free fall path of the articles of produce as they are discharged from the the conveyor onto further handling apparatus. Grading and sorting systems of this general type are known and need not be further described.

In automatic potato graders and sorters there is a considerable quantity of dirt carried on the potatoes and on the conveyor. If the optical system and air blast ejection system are positioned close to each other the optical system becomes covered with dust and dirt to such an extent that the amount of light that gets through the optical system to photodetectors of the color detectors is substantially reduced. This reduced light transmission to the photodetectors results in faulty operation of the grading apparatus.

To minimize the problem of dust and dirt collecting on the optical system it is desirable to separate the optical system as far as possible from the ejecting air blast where much of the dust is raised. This means, however, that the air blast ejector cannot immediately be actuated when an undesired article is first detected by the color grader apparatus since the air blast nozzle is physically displaced downstream from the location of the optical system. To account for this physical displacement it is possible to introduce a fixed time delay means in the electronic circuitry that actuates the valve of the air blast ejector. This has been used, but in systems where the articles of produce and the foreign objects are randomly positioned in respective rows on the conveyor, and where there is an appreciable variation in the sizes and shapes of objects to be ejected, it is necessary to have a rather long duration blast of air to assure that the blast will be fully effective on the object to assure its ejection. This practice consumes a large quantity of compressed air and requires a large compressor and large pressure tank. On mobile harvesting equipment the capacity of the source of electrical power to operate the compressor usually is limited, as is the physical space to house the compressor and pressure tank.

SUMMARY OF THE INVENTION

In order to overcome the problems mentioned above, a conveyor is provided which carries the articles of produce, and the undesired foreign objects, in ordered rows wherein there is a fixed spacing between successive articles or objects in each row. Such a conveyor may be comprised of uniformly spaced, parallel convoluted rollers. Each roller has successive alternating sections of large and small diameters so that pockets are formed between the sections of reduced diameter of adjacent rollers. The articles of produce and foreign objects are carried in the pockets past the optical system and to the ejector location. With the uniform spacing between articles and objects on the conveyor, action of the ejector means may be precisely synchronized with movement of objects on the conveyor. Now it is possible to assure ejection of undesired objects with only a short duration blast of air.

Having overcome the problem of excessive compressed air consumption to eject an object, another problem was created. The rollers become covered with dirt and the color detectors cannot distinguish the dirty rollers from clods of dirt. If this condition were permitted to exist, ejection signals would be produced each time a roller passed under the optical system. This, of course, again would result in excessive consumption of compressed air.

To overcome this problem, synchronizing means are provided to produce gating pulses which occur only when a pocket between adjacent convoluted rollers is directly under the optical system. These gating pulses control operation of the circuity of the grading apparatus and the ejection apparatus. With this arrangement, the rollers are in effect blanked out of the field of view of the optical system and the grading system can "see" only articles and objects in the pockets between rollers.

BRIEF DESCRIPTION OF THE DRAWINGS

This invention will be described with reference to the accompanying drawings wherein.

DESCRIPTION OF PREFERRED EMBODIMENT

Figure 1:
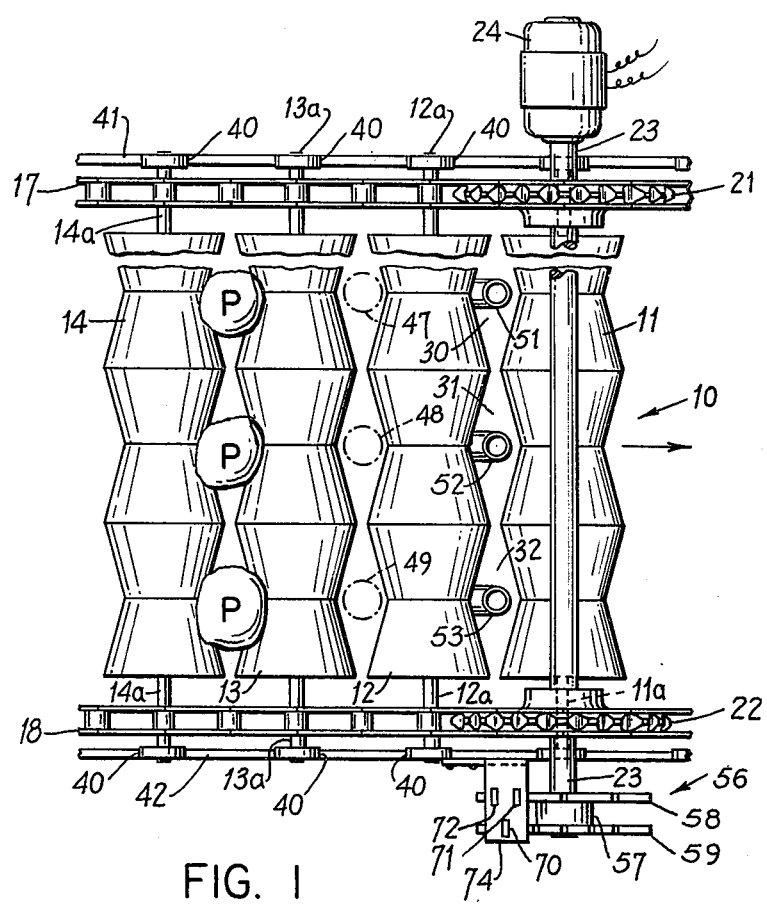
FIG. 1 is a simplified illustration of a portion of an endless conveyor, ejection means, and synchronizing apparatus which may be employed in the practice of the present invention.

In the simplified illustration of FIG. 1, the continuously moving endless conveyor 10 is comprised of adjacent convoluted rollers 11, 12, 13, 14 ... n each having axles 11a, 12a, 13a, 14a ... $n_a$ at each end which are rotatably secured to drive chains 17 and 18. Chains 17 and 18 are driven in unison by means of respective sprocket gears 21 and 22 secured to shaft 23 of motor 24.

Rollers 11 ... n are comprised of successive sections of varying diameters and the regions of the rollers having the largest diameter are in alignment along the direction of movement of the conveyor, as are the successive regions of smallest diameters. It is seen that enlarged void spaces or pockets 30, 31, 32 are formed between successive rollers adjacent the regions of least diameter. As illustrated on the left side of FIG. 1, articles of produce p, such as potatoes, are caused to fill the pockets formed by the convoluted rollers. These pockets are aligned along the conveyor in its direction of movement so that a plurality of aligned rows of produce are moved along the conveyor. The rollers, and thus the pockets in each row, are uniformly spaced in the direction of movement of the conveyor. Roller conveyors of the type illustrated include wheels 40 coupled to the outer ends of axles 11a, 12a, 13a, 14a, $n_a$ of the rollers. At the upstream end of the conveyor (not illustrated) the rollers 40 are in contact with, and thus are rotated by, stationary rails 41 and 42 which are positioned adjacent each side of the conveyor. Rotation of the rollers caused by wheels 40 rolling on rails 41 and 42 causes articles of produce which are introduced onto the conveyor to seek the pockets between rollers. After some distance of travel, during which the articles should be seated in respective pockets, rails 41 and 42 fall away from contact with wheels 40 so that rotation of the rollers ceases. Conveyor systems of this type are well known and will not be further described. It is to be understood that other types of conveyor systems are known for aligning articles of produce in ordered rows with fixed spacings between articles in a row. One other type system is described in U.S. Pat. No. 3,206,022. Any known conveyor system of the general type described may be used in the practice of this invention.

Referring again to FIG. 1, at the produce receiving pockets formed between rollers 12 and 13 there are illustrated in broken lines the respective circles 47, 48 and 49. These circles represent the respective fields of view of optical and color detector systems which are fixedly positioned directly above those positions. Suitable illuminating sources also would be fixedly positioned to illuminate articles in the fields of view.

A plurality of air nozzles 51, 52 and 53 are positioned directly under the pockets 30, 31 and 32 located between rollers 11 and 12.

Each of the nozzles 51, 52 and 53 is positioned to direct a jet of air into its respective pocket to eject from the conveyor an object which has been determined to be undesirable. Articles which pass nozzles 51, 52 and 53 without being ejected may follow a free fall path off the end of the conveyor. The ejected objects will be blown away from the free fall path and will be sorted from the desired articles which may fall onto another conveyor and be carried to a truck which is moving along with the harvester.

As illustrated at the bottom of FIG. 1, a synchronizer assembly 56 is attached to shaft 23. Assembly 56 is comprised of a hub 57 which is secured to shaft 23 by means of a set screw. Synchronizer discs 58 and 59 are secured to opposite ends of hub 57 and the entire assembly rotates with shaft 23. Discs 58 and 59 are illustrated in more detail in FIGS. 2a and 2b. The discs have respective central apertures 61 and 62 which freely fit over drive shaft 23. Disc 58 has a number n, 6 in this example, slits equally spaced about the periphery of the disc. Disc 59 has a number 2n, 12 in this example, slits equally spaced about the periphery of the disc. Each disc has a pair of arcuate mounting slots 63 and 64, respectively which extend through the thickness of the discs. The discs are mounted on opposite ends of hub 57 by means of bolts 65, 66 and 67, 68 which pass through the respective arcuate slots and are threaded into holes in the hub. The angular orientation of the discs may be adjusted in a manner to be described later by rotating the discs prior to tightening the bolts. The arcuate slots permit this rotation.

Referring again to FIG. 1, three solid state light couplers 70, 71 and 72 are fixedly positioned adjacent the peripheries of discs 58 and 59 by means of a rigid arm 74 which is secured to the supporting frame of the conveyor.

Light couplers 70, 71 and 72 each is comprised of a semiconductor light source such as a light emitting diode and a light responsive transistor device whose conduction characteristics change as a function of the light incident on its junction. The light source and light responsive device are spaced apart across a gap. In the arrangement of FIG. 1, the devices are mounted so that the peripheries of the discs 58 and 59 pass through the gap of the respective light couplers. Therefore, light will be transmitted across the gap to the light responsive transistor of a device only when a slit in the periphery of a disc is in registration with the gap of the device. A suitable light coupler is a Photon Coupled Interrupter Module H13B1, sold by General Electric Corporation.

Light coupler 70 produces a series of 12 (2n) pulses each revolution of disc 59 and light couplers 71 and 72 each produce a series of 6 (n) pulses each revolution of disc 58.

On disc 59 the peripheral distance from the center of one slot to the center of an adjacent slot is equal to one half the distance from the center line of one roller to the center line of an adjacent roller of the conveyor. In adjusting the angular position of disc 59 on hub 57, a slot is positioned in the gap of the light coupler when the field of view of the optical system is substantially centered on the center line of a roller. With this alignment optic coupler 70 will produce an output pulse each time the center line of a roller is substantially centered under the optical system and also will produce an output pulse when a pocket between rollers is centered under the optical system of a color detector. As an example in FIG. 2a, slot 76 on disc 59 would be aligned in the gap of light coupler 70 when a roller was centered under the optical system of the color detectors.

Figure 2B:
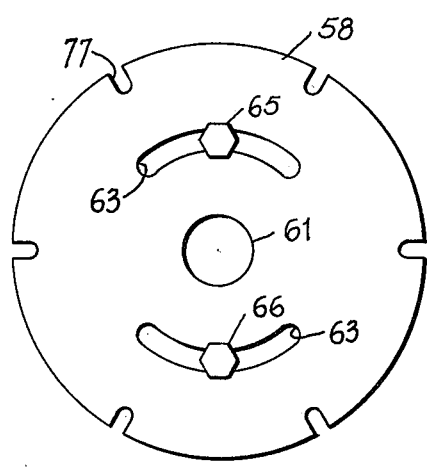
FIGS. 2a and 2b are illustrations of synchronizing discs included in the synchronizing apparatus of FIG. 1.
Figure 2A:
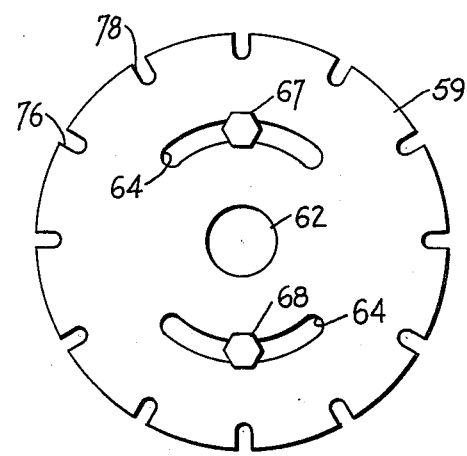

In the angular orientation of synchronizer disc 58 of FIG. 2b, slot 77 would be aligned slightly in advance of slot 78 on disc 59 of FIG. 2a. Therefore, slots 77 and 78 will cause respective light couplers 70 and 71 to produce pulses only when the pockets between rollers are substantially centered under the optical systems associated with each row of produce moving along the conveyor.

In the following description only one row of articles of produce, one color detector, one channel of electronic equipment and one ejection system will be described. It should be understood that in practice, many rows of produce will be moving on a conveyor and a respective color detector, electronics channel and ejection system is associated with each row. The apparatus associated with each row will be identical, so only one will be described.

In the following description, the color components referred to are red and green. These have been chosen for convenience of description since they are used in the color grading of many different articles of produce. In grading potatoes, the color component which would correspond to red in the description may be a component frequency range in the infrared region and actually represents a dip which occurs at approximately 950 nanometers in an otherwise linearly increasing curve of light intensity vs. frequency. The dip is caused by absorption of light by the water content of the potato. In this description and in the accompanying claims the use of the words light and color components are not intended to be limited to the visible portion of the electromagnetic spectrum, but may include the ultraviolet, infrared, and other portions of the spectrum.

Figure 3:
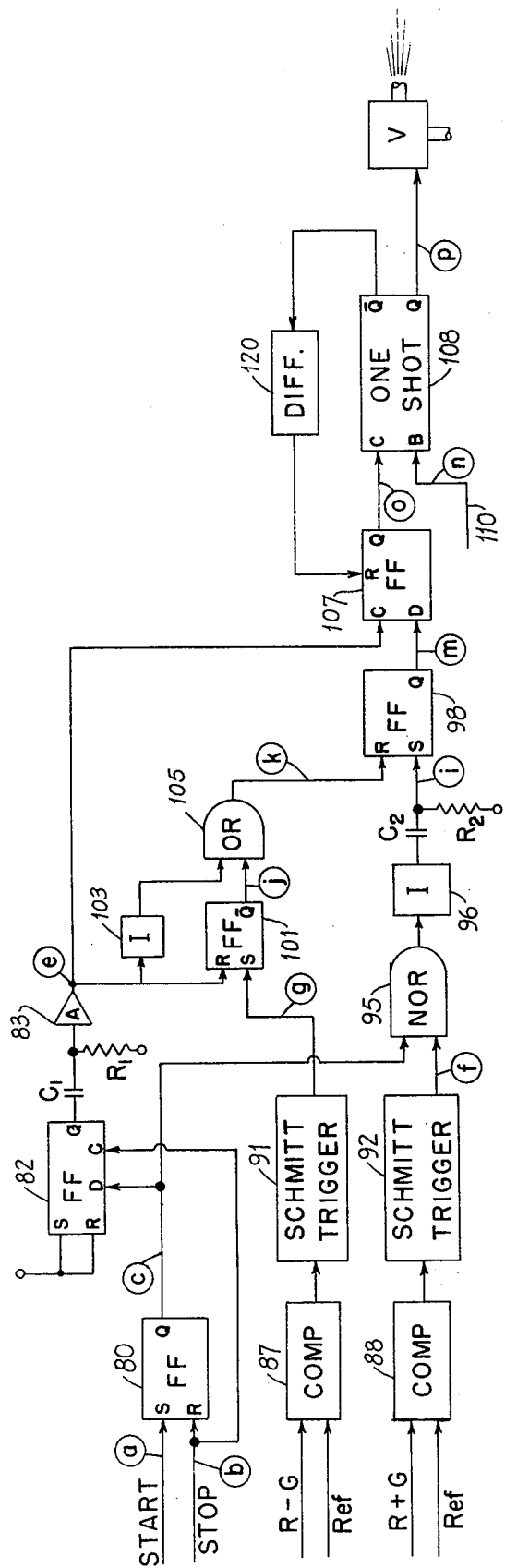
FIG. 3 is a simplified block diagram of electronic circuitry constructed and operated in accordance with this invention.

The system of this invention will be further described by referring to FIG. 3 which is a simplified diagram of a portion of electronic circuitry for processing and synchronizing color signals. The operation of the electronic circuitry will be described in connection with the simplified waveforms of FIG. 4. Illustrated at the top of FIG. 4 are the rollers of conveyor 10 which are assumed to be moving relative to the stationary light couplers 70, 71 and 72 of FIG. 1.

As previously mentioned, disc 59 and optical coupler 70 are arranged so that coupler 70 produces a pulse each time a roller is substantially centered in the field of view of the optical system and when a pocket between adjacent rollers is substantially centered in the field of view. These pulses are illustrated in FIG. 4b and will be referred to hereafter as stop pulses.

It also was mentioned above that disc 58 and light coupler 71 were arranged so that coupler 71 produced output pulses slightly in advance of the centers of pockets between adjacent rollers. These pulses are illustrated in FIG. 4a and will be referred to hereafter as start pulses.

Figure 4:
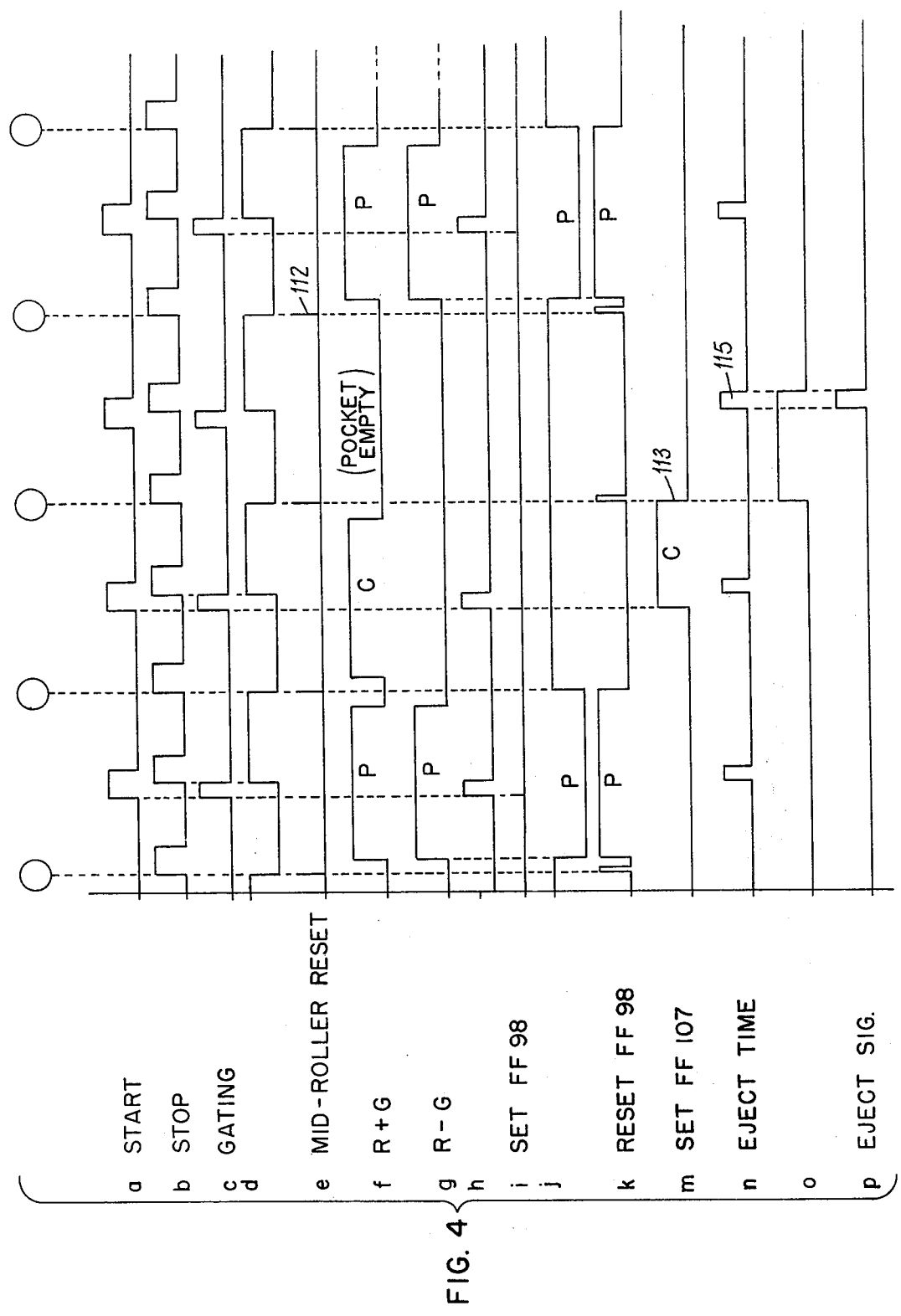
FIG. 4 is a group of simplified waveforms used in explaining the operation of the circuitry of FIG. 3.

Referring now to FIG. 3, the start and stop pulses of FIGS. 4a and 4b are coupled to the set and reset inputs of flip flop 80. The Q output of flip flop 80 is the gating pulses of FIG. 4c, each of which commences at the leading edge of a start pulse and terminates at the leading edge of a stop pulse. As seen in FIG. 4, the gating pulses FIG. 4c occur substantially midway between rollers. That is, one occurs each time a pocket between adjacent rollers is centered in the field of view of the optical system.

The gating pulses of FIG. 4c and the stop pulses of FIG. 4b are coupled as the respective data and clock inputs to a D-flip flop 82. This device is an integrated circuit chip that produces a slight delay in the data input. The circuit operates to produce on its Q output the level on the data input (delayed) upon each occurrence of a clock input. The output of D-flip flop 82 is the waveform of FIG. 4d whose repetition rate is one-half that of the stop pulses of FIG. 2b.

The negative going trailing edges of the pulses of FIG. 2d are differentiated by capacitor $C_1$ and resistor $R_1$, are amplified and inverted in amplifier 83, resulting in the short positive going pulses of FIG. 4e. These pulses will be referred to as mid-roller reset pulses, it being evident from FIG. 4 that they occur at the time the center lines of the rollers are substantially centered in the field of view.

Referring again to FIG. 3, a comparator 87 receives a red minus green (R—G) color signal and a reference level signal, and comparator 88 receives a red plus green (R+G) color signal and a reference level signal. The red minus green and red plus green color signals may be produced by any type of known color grading apparatus which receives light from an article of produce to be graded and by means of color filters and photodetectors produces respective red and green color signals which are functions of the amount of red and green light received from the article. Electronic circuitry combines the two color signals to produce the R—G and R+G color signals. Because apparatus for producing these types of color signals are well known further description is believed to be unnecessary, except to make reference to my copending application Ser. No. 553,362, entitled "Produce Grader", filed Feb. 26, 1975 now U.S. Pat. No. 3,944,819, which describes circuitry of that type.

The respective reference level signals coupled to comparators 87 and 88 are chosen according to the desired characteristics of the articles of produce being graded. When the R—G and R+G signals differ from their corresponding reference level signals by predetermined magnitudes, they will trigger their respective Schmitt trigger circuits 91 and 92.

The comparator circuit 88 will produce an output signal when any object is in a pocket between rollers and in the field of view of the optical system. Thus, whether the object in a pocket is a potato, a rock, or a clod of dirt, an R+G signal will be present and will produce an output signal from Schmitt trigger circuit 92. This output is illustrated as the waveform of FIG. 4f.

On the other hand, an R—G signal will be produced when a potato is in a pocket and being viewed by the color detector. A rock or a clod of normal type dirt ordinarily will not have enough of the desired color in its reflected light, assumed to be red in this example, to produce an R—G signal This signal is illustrated as waveform FIG. 4g.

When there is nothing in a pocket between rollers, neither an R+G or an R—G signal will be produced.

In the illustrated waveforms of FIGS. 4f and 4g, it is assumed that a potato (P) is in the first pocket viewed by a color detector, a clod of dirt (C) is in the second pocket immediately behind the first pocket, the third pocket is empty, and a potato is in the fourth pocket.

It will be noted in the waveforms of FIGS. 4f and 4g that a potato or a clod actually is viewed by the color detector whenever they are in the field of view of the color detector and without regard to the start, stop, gating, and mid-roller reset pulses described above.

The R+G output signal from Schmitt trigger circuit 92, FIG. 4f, is coupled as one input to NOR circuit 95 and the gating pulses from flip flop 80, FIG. 4c, are coupled as the other input thereto. After inversion in inverter 96, the output of NOR circuit 95 is the series of pulses represented by waveform FIG. 4h. This waveform is differentiated by capacitor $C_2$ and resistor $R_2$, and short pulses of FIG. 2i corresponding to the leading edges of the pulses of FIG. 2h are coupled to the set input of set-reset flip flop 98.

By comparing the waveforms of FIGS. 4f and 4i it is seen that set pulses are produced by both a potato and by a clod, but no set pulse is produced when the pocket being viewed is empty.

The R—G output from Schmitt trigger circuit 91, FIG. 4g, is coupled as the set input to set-reset flip flop 101 and the mid-roller reset pulses of FIG. 4e are coupled as the reset pulses thereto. Flip flop 101 responds to these inputs to produce the $\overline{Q}$ output illustrated in FIG. 4j. The leading edges of the negative going pulses of FIG. 4j are produced by the leading edges of the R—G pulses in FIG. 4g and the trailing edges of the pulses of FIG. 4j are produced by mid-roller reset pulses of FIG. 4e.

The waveform of FIG. 4j and mid-roller reset pulses, inverted by inverter 103, are coupled as inputs to OR gate 105. OR gate 105 combines its two input signals to produce the output signal of FIG. 4k, this signal being the reset signal to set-reset flip flop 98.

The set input to flip flop 98 are the pulses of waveform FIG. 4i which occur at the leading edges of gated R+G signals, FIG. 4h, which occur when any type of object is in a pocket in the field of view of the color detector.

Considering the operation of flip flop 98 in response to its two input signals, FIG. 4i and 4k, it is seen that whenever a potato (P) signal is present in the waveform of FIG. 4k, flip flop 98 will be reset and the output of the flip flop is low, see FIG. 4m. On the other hand, when a clod of dirt (C) is in the field of view the reset signal to flip flop 98, FIG. 4k, is low and the output of the flip flop goes high when a set pulse is present. Mid-roller reset pulses passing through OR gate 105 reset flip flop 98 each time the center line of a roller is centered in the field of view, this indicating the end of one field of view and the beginning of the next one.

It also will be noted by comparing the waveforms of FIGS. 4f, 4h, 4k and 4m, that no output is produced by flip flop 98 when a pocket in the field of view is empty. Consequently, the only output signals produced by flip flop 98 correspond to clods of dirt.

The output of flip flop 98 is coupled as the data input to D-type flip flop 107 and mid-roller reset pulses of FIG. 4e are coupled thereto as the clock input. Also, the differentiated $\overline{Q}$ output of one shot multivibrator 108 is coupled to the reset input of D-type flip flop 107.

The Q output of flip flop 107 is coupled as a trigger input to one shot 108 and eject time signals on line 110 are coupled as enable signals to the other input of one shot 108. The eject time signals are shown in FIG. 4n and are generated by synchronizing disc 58 and light coupler 72 of the synchronizer assembly 56, FIG. 1. Light coupler 72 is angularly arranged relative to the slots in disc 58 so that the leading edges of the eject time pulses occur slightly after the leading edges of start pulses and of the gating pulses, as may be seen by comparing the waveforms of FIGS. 4a, 4c and 4n.

D-type flip flop 107 is the same type as the previously described flip flop 82 and in operation the clock input transfers to the Q output the signal on the data input. As previously mentioned, the data input is slightly delayed in this device. Therefore, by referring the FIGS. 4e and 4m, the mid-roller reset pulse 112 of FIG. 4e clocks through to the Q output the delayed high signal 113 of FIG. 4m to produce the leading edge of the positive going waveform of FIG. 4o. The positive going output of flip flop 107 is coupled as an enabling signal to the C input of one shot multivibrator 108 and upon occurrence of the next eject time pulse 115 of FIG. 4n the one shot is triggered to produce on its Q output the eject signal of FIG. 4p. The $\overline{Q}$ output of one shot 108 is differentiated in differentiator 120 and the pulse corresponding to the trailing edge of the positive going pulse of FIG. 4n is coupled back to the reset input of flip flop 107 to reset it to its first state.

The eject pulse of FIG. 4p is coupled to an actuator of valve V which produces a blast of air through the nozzle to eject the undesired object.

It will be understood from the above description that flip flop 107 stores signals which correspond only to an undesired object such as a clod or a rock, FIG. 4o, and this signal is held until the occurrence of the next eject time pulse of FIG. 4n, at which time a signal is passed to actuate the valve V to produce an ejecting blast of air. In practice, the angular position of light coupler 72 is manually adjusted to assure that the eject time pulses occur at the times that produce the optimum effect in ejecting objects from the conveyor. Similarly, the durations of the eject pulses of FIG. 4p are chosen to assure ejection of objects from the conveyor with a blast of air that is no longer in duration than necessary.

It will be noted that if a R—G signal, FIG. 4g, occurs after a set pulse, FIG. 4i, sets flip flop 98, a pulse will be coupled to the D input of flip flop 107. This indicates that a desirable article of produce was recognized late in its passing through the field of view. However, in such a situation that R—G signal will reset flip flop 98 before the presence of the next occurring mid-roller pulse of FIG. 4e so that flip flop 107 will not be set. This feature has the effect of permitting the system to scan for a desired article throughout the entire field of view irrespective of the duration of the gating pulses of FIG. 4e.

It will be noted in FIG. 4m that the positive going signal 113 representing a clod of dirt occurred between the second and third rollers which are illustrated at the top of the Figure, but that the corresponding eject signal of FIG. 4p occurred in the time period between the next adjacent pair of rollers. This is in accordance with the physical arrangement illustrated in FIG. 1 wherein the fields of view 47, 48 and 49 are between rollers 12 and 13, but any objects then being viewed will travel to the illustrated locations of pockets 30, 31 and 32 before they encounter ejection nozzles 51, 52, 53.

Other physical arrangements may be employed for providing timing pulses which occur in synchronism with movement of the conveyor. Also, the logic circuitry described in connection with FIG. 3 is but one specific example of suitable circuitry. Other equivalent circuitry may be used. It is possible to construct and align the synchronizing discs of synchronizer assembly 56 so that the gating pulses of FIG. 4c and the mid-roller reset pulses of FIG. 4e are directly generated by respective light couplers associated with synchronizer discs. Also, it is possible, but not presently preferred, to use the gating pulses of FIG. 4c as the eject time pulses of FIG. 4n. However, the independent generation of eject time pulses affords the greatest opportunity for precise timing of the eject pulses to achieve optimum efficiency in the use of compressed air. The system illustrated in FIG. 3 affords considerable flexibility in the generation of the synchronized timing signals.

In one successfully operating produce grader and sorter constructed and operated as described the circuitry was built from commercially available integrated circuit devices having the following identification.

| Items of FIG. 3 | Commercial Designation |
| --- | --- |
| Flip flops 80, 82, 98, 101, 107 | CD4013 |
| Comparators 87, 88 | N55585 |
| Schmitt triggers 91, 92 | MC14583CP |
| NOR 95, OR 105 | CD 4011 |
| One Shot 108 | MC 14528 |

Figure 5:
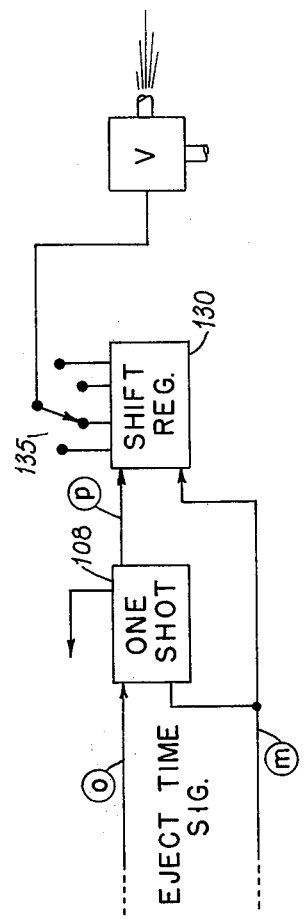
FIG. 5 is an alternative arrangement of the ejection portion of the system of FIG. 3.

In referring to FIGS. 1 and 3 it is seen that the ejection nozzles 51, 52 and 53 are located just one roller spacing away from the locations of the color detector means which are indicated in FIG. 1 by the fields of view 47, 48 and 49. This was done in an attempt to prevent dust produced by the air ejecting nozzles 51, 52 and 53 from building up on the optical portion of the color detectors. In some cases it may be desirable to separate the air nozzles even further from the color detectors. This may be done by the addition of a shift register between one shot 108 and the valve V of FIG. 3. As illustrated in FIG. 5, shift register 130 is coupled to receive the eject pulse output, FIG. 5p, of one shot 108. This signal is entered into the first stage of the shift register and is shifted through successive stages thereof by the eject time pulses of FIG. 4n. The outputs of successive stages of the shift register are connected to the stationary contacts of switch 135. By moving the movable contact of switch 35 to an output of a selected stage of shift register 130 the eject pulse that actuates valve V may be caused to occur when the detected undesired object on the conveyor is two, three, or more roller spaces away from the optical system. Because the shift pulses for shift register 130 are generated in synchronism with the movement of the conveyor, the ejection of objects still occurs in synchronism with movement of the conveyor.

Although an air ejection system has been described, a mechanical ejector may be employed if desired.

In its broader aspects, this invention is not limited to the specific embodiment illustrated and described. Various changes and modifications may be made without departing from the inventive principles herein disclosed.

What is claimed is:

1. In a produce grading and sorting system
   detector means for receiving radiation from desired articles of produce and from undesired objects in a given field of view of the detector means and for producing a plurality of electrical signals whose magnitudes correspond to respective predetermined components of the received radiation,
   conveyor means having uniformly spaced produce receiving means thereon for continuously moving a row of uniformly spaced articles of produce into and through said field of view,
   means for producing a first signal when a desired article or an undesired object is in said field of view,
   means responsive to said electrical signals for producing a second signal only when a desired article is in said field of view,
   means synchronized with the movement of said conveyor means for producing gating pulses when a produce receiving means of the conveyor means is substantially centered in said field of view,
   means synchronized with the movement of the conveyor for generating trigger pulses which occur at times substantially midway between the occurrence of adjacent gating pulses,
   means responsive to the occurrence of both a first signal and a gating pulse for producing a set pulse,
   means for coupling said second signal to said means for producing a set pulse to prevent the producing of a set pulse upon occurrence of a second signal,
   bistable means responsive to set pulses and to each trigger pulse occurring next after the beginning of a set pulse for transferring said bistable means to its second state,
   means responsive to the transfer of the bistable means to its second state and operable in synchronism with said conveyor for producing an eject pulse when a previously upstream produce receiving means on the conveyor is in said field of view and when a detected undesired object is at a given downstream position from said field of view.

2. The combination claimed in claim 1 and including, means operating in synchronism with movement of the conveyor for producing eject time pulses each occurring when a produce receiving means on the moving conveyor is in said field of view,
   said eject time pulses being coupled to said means for producing eject pulses.

3. The combination claimed in claim 2 wherein the means for producing an eject pulse is responsive to the transfer of the bistable means to its second state and to the eject time pulse occurring next thereafter,
   said means for producing an eject pulse operating to produce an eject pulse commencing with the commencement of an eject time pulse.

4. The combination claimed in claim 2 and including means for delaying said eject pulses by one or more time periods each of which corresponds to the period between successively occurring eject time pulses.

5. The combination claimed in claim 2 wherein said eject time pulses commence immediately after a gating pulse each time a produce receiving means is in said field of view.

6. The combination claimed in claim 2 wherein said eject time pulses correspond to said gating pulses.

7. In a synchronized produce grading and sorting system
   a conveyor having uniformly spaced produce receiving means for continuously moving a row of uniformly spaced articles of produce into and through a field of view,
   detecting means for detecting characteristics of desired articles and undesired objects passing through said field of view and for producing electrical signals corresponding to detected characteristics,
   means responsive to said electrical signals for producing a first signal when either a desired article or an undesired object is in said field of view,
   means responsive to said electrical signals for producing a second signal only when a desired article is detected in said field of view,
   means operating in synchronism with movement of said conveyor for generating first and second series of pulses,
   successive pulses of the first series occurring when successive produce receiving means of the conveyor are substantially centered in said field of view and successive pulses of the second series occurring when successive produce receiving means are substantially equidistant on opposite sides of said field of view, means responsive to coincidence of a first signal and a pulse of the first series for setting a bistable means to its second state, means for preventing said bistable means from being set to its second state upon occurrence of a second signal and for placing the bistable device in its first state after occurrence of each pulse of the second series, a second bistable device responsive to said second series of pulses and to the output of said first bistable device and transferring to its second state if the first bistable device is in its second state upon occurrence of the next occurring pulse of the second series, means for producing a series of timing pulses each of which occurs when a produce receiving means is in said field of view and each occurring after a corresponding one of the pulses of the first series, means responsive to the output of said second bistable device and to said timing pulses for producing an eject pulse upon occurrence of a timing pulse when the second bistable device is in its second state, and means responsive to the eject pulse for ejecting an article of produce on said conveyor.

8. In a synchronized produce grading and sorting system, an endless conveyor comprised of a plurality of parallel uniformly spaced rollers having aligned regions of alternately occurring large and small diameters, whereby the regions between the small diameters of adjacent rollers form produce receiving means, color detector means fixedly positioned relative to said conveyor and having a given field of view that includes an article at a given position on said conveyor as the conveyor moves articles therealong, said color detector producing a plurality of color signals corresponding to respective color components received from desired and undesired articles on said conveyor, means responsive to said color signals for producing a first signal when either a desired or undesired article is on said conveyor in said field of view but producing no signal when an empty produce receiving means is in said field of view, means responsive to said color signals for producing a second signal only when a desired article is in said field of view, means synchronized with the movement of the conveyor for producing a gating pulse each time one of said produce receiving means is substantially centered in said field of view, means synchronized with the movement of the conveyor for producing a reset pulse each time one of said rollers is substantially centered in said field of view, means responsive to the occurrence of a first signal and a gating pulse for producing a set pulse which commences substantially at the commencement of the gating pulse, bistable means coupled to receive said set pulses and operable to transfer from its first state to its second state upon occurrence of a set pulse, means for coupling said second signal and said reset pulses to said bistable device to prevent it from transferring to its second state upon occurrence of a second signal and for placing the bistable device in its first state upon occurrence of a reset pulse, a second bistable device, means for coupling the output of the first bistable device and said reset pulses to the second bistable device, said second bistable device transferring from its first to its second state upon occurrence of both a second state output of the first bistable means and the reset pulse occurring next thereafter, means for producing timing pulses each occurring when a produce receiving means is in said field of view, pulse producing means responsive to both a second state output of the second bistable device and the timing pulse occurring next thereafter for producing an eject pulse, and means including ejection means disposed adjacent said conveyor and downstream of the detector means and responsive to said eject pulses for ejecting undesired articles from said conveyor.

9. The combination claimed in claim 8 wherein said means including ejection means includes signal delay means coupled to said pulse producing means and operating in synchronism with said timing pulses for delaying the operation of the ejection means by one or more time increments each corresponding to the period between timing pulses.

* * * * *